J. DONNELLY.
PAN LIFTER.
APPLICATION FILED MAY 25, 1914.
1,151,672.
Patented Aug. 31, 1915.
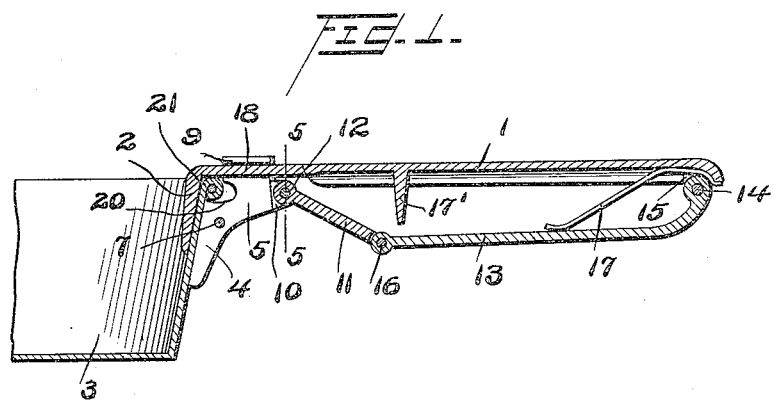
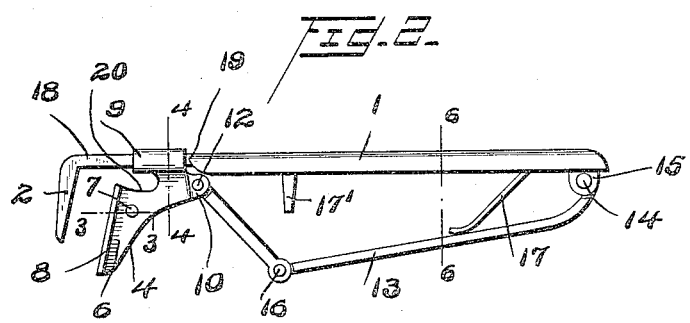
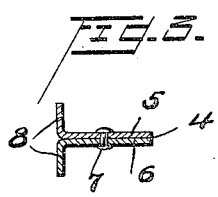
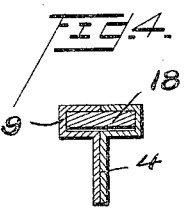
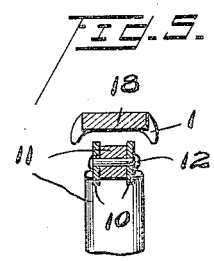
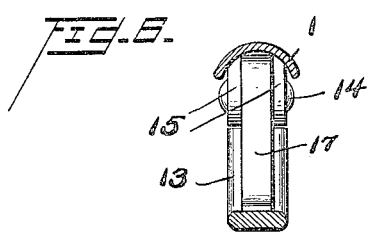
Witnesses
Inventor
Joseph Donnelly
By Joshua R. H. Potts
Attorney
COLUMBIA PLANOGRAPH CO., WASHINGTON, D. C.

UNITED STATES PATENT OFFICE.

JOSEPH DONNELLY, OF PHILADELPHIA, PENNSYLVANIA.

PAN-LIFTER.

1,151,672. Specification of Letters Patent. Patented Aug. 31, 1915.

Application filed May 25, 1914. Serial No. 840,771.

*To all whom it may concern:*

Be it known that I, JOSEPH DONNELLY, a citizen of the United States, residing at Philadelphia, in the county of Philadelphia and State of Pennsylvania, have invented certain new and useful Improvements in Pan-Lifters, of which the following is a specification.

My invention relates to improvements in pan lifters, the object of the invention being to provide an improved construction of pan lifter which may be operated to grasp and lift hot pans without burning the hands.

A further object is to provide an improved pan lifter which is operated by the grip of the hand upon the handle and upon a pivoted link to cause the movable jaw to move toward the fixed jaw and tightly grip a pan.

A further object is to provide a pan lifter of simple, inexpensive construction, strong and durable in use.

With these and other objects in view, the invention consists in certain novel features of construction and combinations and arrangements of parts as will be more fully hereinafter described and pointed out in the claims.

In the accompanying drawings: Figure 1 is a view in longitudinal section illustrating my improved pan lifter in gripping position on a pan. Fig. 2 is a view in side elevation. Fig. 3 is a fragmentary view in section on an enlarged scale on the line 3—3 of Fig. 2. Fig. 4 is a similar view on the line 4—4 of Fig. 2. Fig. 5 is a similar view on the line 5—5 of Fig. 1. Fig. 6 is a similar view in section on the line 6—6 of Fig. 2.

1 represents a handle which is provided at one end with a fixed jaw 2, said jaw being slightly beveled as shown to allow it to be readily positioned against the inner face of the pan indicated at 3.

Movably mounted on the handle 1, is my improved jaw 4. This jaw 4 is composed of two pieces of sheet metal 5 and 6, secured together by a rivet 7, and having their forward edges flared apart forming flanges 8, which together constitute a gripping surface coöperating with the fixed jaw 2 to grip the side of the pan 3 between them.

The movable jaw 4 is provided with an angular sleeve 9 mounted to slide on the handle 1. This sleeve 9 is formed by bending the upper portions of the plates 5 and 6 as shown clearly in Fig. 4, and the said plates 5 and 6 are slightly offset at one end forming perforated ears 10 to receive one end of a relatively short link 11 which is pivotally connected to the movable jaw by a rivet 12 extending through said perforated ears 10, and through the link 11. A relatively long link 13 is pivotally connected at one end to the handle 1 by means of a rivet 14 which extends through the link 13 and through perforated ears 15 integral with the handle. The other end of the link 13 is pivotally connected by a rivet 16 to the shorter link 11. A spring 17 is connected to the handle as shown in Fig. 1, and at its free end bears against the link 13 normally holding the links in the position shown in Fig. 2, and hence normally holding the movable jaw away from the fixed jaw. A lug 17' integral with handle 1, limits the upward movement of the link 13, preventing the movable jaw from being forced against the fixed jaw when there is no pan between the jaws. In other words, this lug is in position to be engaged by the link 13 and limit its movement toward the handle 1. The handle 1, where it receives the sleeve 9, is rectangular in cross section as shown clearly in Figs. 1, 2, and 4.

The main portion of the handle is somewhat rounded to afford a smooth contact with the palm of the hand, and at the juncture of the flat portion 18 with the rounded portion of the handle, a shoulder 19 is provided which limits the movement of the movable jaw. The movable jaw is provided with a recess 20 which is so located as to accommodate the ordinary bead 21 provided on most types of pans used for cooking purposes, and hence the jaws are allowed to come close together in gripping the side of the pan.

It will be noted that the jaws 2 and 4 are inclined relative to the handle at the ordinary angle of inclination ordinarily given pans of the type used in stoves, and hence the surface of the pan is firmly gripped.

To operate the device, it is simply necessary to grasp the handle 1 with the fingers pressing against link 13, and when the link 13 is drawn toward the handle, the removable jaw 4 will be forced toward the fixed jaw 2, and when pressure is relieved, the spring 17 will draw the movable jaw away from the fixed jaw.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A pan lifter, comprising a handle having a fixed jaw at one end, a movable jaw mounted to slide on the handle, a link pivotally connected at one end to the handle, a second link pivotally connected at one end to the movable jaw, said links pivotally connected, and a spring exerting pressure on one of the links tending to draw the movable jaw away from the fixed jaw, substantially as described.

2. A pan lifter, comprising a handle having a fixed jaw at one end, a movable jaw mounted to slide on the handle, a link connected at one end to the handle, a second link connected at one end to the movable jaw, said links pivotally connected, a spring exerting pressure on one of the links tending to draw the movable jaw away from the fixed jaw, said movable jaw comprising two sheet metal plates riveted together, and having an angular sleeve formed by bending said plates, said sleeve movable on the handle, substantially as described.

In testimony whereof I have signed my name to this specification in the presence of two subscribing witnesses.

JOSEPH DONNELLY.

Witnesses:
ELIZABETH V. MARTIN,
EUGENE M. JEANNISSON.

Copies of this patent may be obtained for five cents each, by addressing the "Commissioner of Patents, Washington, D. C."